Patented Aug. 17, 1943

2,327,115

UNITED STATES PATENT OFFICE 2,327,115

METHOD OF TREATING LATEX

Chester E. Linscott, Ridgewood, and John McGavack, Leonia, N. J., assignors to United States Rubber Company, New York, N. Y., a corporation of New Jersey No Drawing. Application August 2, 1940,
Serial No. 350,070

8 Claims. (Cl. 260—822)

This invention relates to a method of treating latex, and more particularly to a method of purifying formaldehyde preserved latex.

It has been found that formaldehyde preserved latex, after ageing a certain minimum period of time may be transposed into a thick paste on raising the pH of the latex to 6.5 or above, as by the addition of ammonia, and that on diluting such latex paste, the rubber will readily separate out as a purified or washed cream, and that such cream may be easily removed from the subnatant serum portion and further washed by diluting with water and allowing the rubber aggregates to cream out again.

In carrying out the present invention, formaldehyde is added to the latex after tapping in order to prevent natural decomposition. The amount of formaldehyde added is not important except that sufficient should be added to preserve the latex until the aggregation or purification operations. If purification is to be done at the plantations within a relatively short period of time after the addition of the formaldehyde, as low as .2% formaldehyde based on the latex, may be sufficient. If the latex is to be preserved with the formaldehyde for a number of months, as where the latex is aggregated or purified in the country to which it is exported, then larger amounts of formaldehyde are necessary to adequately preserve the latex. Up to 3% formaldehyde or more may be used, although 1% would appear to adequately preserve latex over long periods of time. The pH of latex to which such formaldehyde has been added is about 5.0 to 6.0. The minimum time of ageing of the formaldehyde preserved latex before the rubber aggregates will readily separate from the serum portion in the form of a cream on addition of ammonia and diluting, has been found to be 72 hours or 3 days. After 3 days ageing, the rubber particles in the formaldehyde preserved latex will aggregate to form a thick stiff paste on addition of the ammonia, and this thickening may be accelerated by agitating the latex. On dilution of the thick paste of rubber aggregates, preferably to below 20% solids content, separation of the rubber particles from the serum in the form of a thick cream is almost instantaneous. If desired, the latex, after the necessary ageing, may be diluted before the addition of ammonia, or after the addition of ammonia but before thickening of the latex to a stiff paste, and here again, the rubber particles will cream out on standing or agitating. The formaldehyde latex may also be added to the dilution water containing the necessary amount of ammonia, upon which flocculation of the rubber particles takes place almost immediately. These aggregates may be stirred with the water to wash them and upon the cessation of stirring the aggregates rise rapidly to form a thick cream. If desired, the paste of aggregated rubber particles formed after addition of the ammonia may be compounded and used as such, or on dilution, in the manufacture of rubber articles by filtration processes, the aggregation of the rubber particles providing a readily filterable composition.

The amount of ammonia added to aggregate the rubber particles should be sufficient to raise the pH of the latex to at least 6.5. The pH may be measured before or after dilution. If the latex containing the formaldehyde has not been allowed to age at least 3 days before addition of the ammonia, creaming of the rubber particles on dilution will ensue only very, very slowly, similarly to the creaming of ordinary formaldehyde preserved latex on dilution. The creaming of formaldehyde preserved latex to which ammonia has been added after an ageing period of at least 3 days, and the latex diluted, is a matter of minutes, or of only a few hours where only the minimum time of standing has elapsed before addition of the ammonia, whereas creaming of diluted formaldehyde preserved latex where the pH has not been raised to 6.5, or creaming of formaldehyde preserved latex where the ammonia has been added to a pH of 6.5 but before the 3 day ageing period has elapsed, may be a matter of days or weeks.

After dilution and creaming, the purified cream portion comprising aggregated rubber particles and the serum portion may readily be removed from each other by decantation, filtration, centrifugation or the like. The cream may be diluted with water, or water containing ammonia, and again separated from the serum, and such operations repeated until the desired purification has been accomplished. The aggregated rubber particles in the cream may be redispersed and the viscosity of the cream consequently reduced to form a fluid latex by permitting the cream to stand for extended periods of time. This redispersion of the aggregates and reduction of the viscosity may be very materially accelerated by the application of a shearing force or agitating or shaking, or by heating, or by the addition of more ammonia, or by a combination of such steps. The higher the pH of the cream, the easier will be the redispersion of the aggregated rubber particles and the reduction in viscosity. Thus, the larger the amounts of ammonia that are added in aggregating the cream, the easier will be the redispersion of the aggregated particles after separation of the cream from the serum. With large amounts of ammonia, however, the cream should not be allowed to stand too long before separation from the serum, otherwise the aggregates in the cream will tend to redisperse and reduce the viscosity of the cream to near the viscosity of the serum and thus tend to make difficult the successful separation of the cream and serum portions. The pH should therefore preferably not be raised above 11. While ammonia is very much preferred as the alkaline material for raising the pH of the formaldehyde preserved latex to 6.5 or above, other alkaline materials may be used, provided the pH is not raised above 11. If it is desired to keep redispersion of the cream at a minimum until after separation of the cream and serum portions, the rubber particles should be aggregated at a pH between 6.5 and 10, and then more ammonia added to the final cream to facilitate redispersion of the rubber aggregates.

Ammonia is the preferred alkaline material for several reasons. First, the purified and redispersed latex has some properties similar to purified ammonia preserved latices. Second, the amount of ammonia added during the process is not critical with respect to the stability of the latex and to the redispersibility of the aggregated rubber particles. Third, no non-volatile residue remains in a dried film of the purified latex that may be water absorbent, as in the case of the alkali metal salts, where fixed alkalies are used as the alkaline material to raise the pH. Coupled with the above advantages is the low cost of ammonia as a source of volatile alkali. Other alkaline materials that may be used to raise the pH of the latex are fixed alkalies, organic aliphatic amines, alkaline earth oxides, basic salts, ammonia soaps, and ammonia preserved latex. When ammonia or some of the organic amines are added, there will be a reaction between the free formaldehyde and the amine, but this in no way disturbs the working of the process so long as sufficient of such alkaline material is added to raise the pH to at least 6.5.

The purified creams which separate on dilution and aggregation of the latex according to the present invention are not creams of high concentrations such as are obtained by creaming ammonia preserved latex by means of hydrophilic colloidal creaming agents. For example, creams of 20 to 35% solids concentration may be obtained according to the present invention on dilution of a formaldehyde preserved latex containing 35 to 45% solids to a 5 to 15% solids concentration. The purified creams of the present invention, however, have an advantage over the more concentrated creams obtained by creaming ammonia preserved latex with hydrophilic colloidal creaming agents, in that the dried films from latex purified according to the present invention are free from any residual amounts of the hydrophilic colloidal materials used in such creaming operations. Purified rubber may be prepared from purified latex produced according to the present invention by drying procedures. The rubber in the aggregates in the cream, and purified rubber prepared from such cream has a characteristic content of combined formaldehyde due to the initial preservation of the latex with formaldehyde. A simple test for the presence of combined formaldehyde in the rubber is to place some of the rubber in a distillation flask, add water and distill until a negative test for formaldehyde is shown in the distillate; then replace the water with 10% sulphuric acid and resume the distillation. The formaldehyde freed by the action of the sulphuric acid can be detected in the distillate by any one of the usual tests for formaldehyde; for example, add a few drops of a dilute solution of sodium nitroprusside and a similar amount of phenylhydrazine hydrochloride. The solution is then made slightly alkaline, and if formaldehyde is present a blue color readily appears. A better method is to add phenylhydrazine hydrochloride to the distillate, then potassium ferricyanide, and finally concentrated hydrochloric acid. A wine or violet color results if formaldehyde is present.

Various examples of the present invention are set forth below but these are merely exemplary of the invention and are not intended as limitations thereof. All percentages of formaldehyde are based on the latex.

Example I

Fresh latex of 37.8% total solids content was preserved at the plantation with .5% formaldehyde. After standing various periods of time, samples of this latex equivalent to 400 volumes were removed, 14.4 volumes of 5% aqueous ammonia added, raising the pH to 7.2, and the samples stirred with a mechanical stirrer rotating at about 250 revolutions per minute. In the case of samples where the ammonia was added before the latex had been allowed to age three days after the addition of the formaldehyde, the latex did not thicken on continued stirring, and on dilution to 10% solids no creaming occurred on these samples even after three days standing. In the case of the sample to which ammonia had been added after three days ageing, a thick slurry of rubber aggregates formed on stirring for an hour and a quarter. On adding sufficient water to the thus aggregated latex to dilute it to 10% solids, creaming was almost instantaneous. The cream and serum portions were separated from each other by draining the serum. The thick cream of rubber aggregates was then diluted with water and allowed to cream a second time. The thick cream was then separated from the serum by a second serum drainage and 20 volumes of 20% aqueous ammonia were added to the cream to hasten redispersion of the rubber aggregates, and after four days standing at room temperature with occasional stirring, the rubber particles had redispersed and the viscosity of the latex lowered to approximately that of an ammonia preserved normal latex. In the samples where the ammonia was added to the latex five and seven days after the formaldehyde addition, the time of stirring to induce aggregation and thickening was two hours, and one and a half hours, respectively. Tests after nineteen days standing and again after twenty-seven days showed that thickening could be induced on stirring in less than half an hour.

Another series of samples run on a different lot of latex, preserved with .5% formaldehyde again showed no thickening occurring on raising the pH to 7.2 before three days ageing, even on continuous stirring after the ammonia addition for over six hours. In the case where the ammonia had been added to the latex after four days, thickening occurred on stirring for four and a half hours, followed by very rapid creaming on dilution. In samples where ammonia had been added after five days and longer periods of standing, thickening occurred on stirring for 10 to 15 minutes.

The above results show that in order to obtain the desired aggregation of rubber particles on raising the pH of a formaldehyde preserved latex, it is necessary that the formaldehyde preserved latex be allowed to age at least three days before raising the pH, otherwise aggregation of the rubber particles to induce rapid creaming thereof will not take place.

*Example II*

The following example shows that latex preserved with minimum amounts of formaldehyde may also be purified according to the present invention.

In this case a 40.8% total solids latex was preserved with .25% formaldehyde. To 40 volumes of this latex 33 days after addition of the formaldehyde was added 1.1 volumes of 5% aqueous ammonia, thereby raising the pH to 8.7. The latex stiffened to a thick pasty mass on stirring for a very short period of time and after dilution the cream separated quickly from the serum portion. The serum was drained from the cream, more water mixed with the cream, and again the thick cream of rubber aggregates separated from the serum by serum drainage. 2.7 volumes of 20% aqueous ammonia was then added to the thick cream portion of rubber aggregates and the mass boiled gently whereupon the aggregates quickly dispersed and the viscosity of the creamed slurry was reduced to the fluidity of ordinary ammonia preserved latex. The total solids content of the purified cream in this case was 23.6%.

*Example III*

The following example illustrates the purification of formaldehyde preserved latex according to the present invention on raising the pH of the latex with ammonia to different values between 6.5 and 11 and diluting.

A 42% total solids content latex preserved with .5% formaldehyde was shipped from the plantations to the United States. The latex at time of examination was six months old and had a pH of 5.4. Although slightly aggregated, as all formaldehyde preserved latices are, this latex would not cream readily on dilution with water. It is known, of course, that formaldehyde preserved latices will cream on dilution and standing for long periods of time, but such creaming is a matter of days and weeks.

Seven samples of this formaldehyde preserved latex were treated with the various amounts of ammonia necessary to give a series of pH's between 7 and 10.5, and the resultant mixtures stirred by hand until thickening took place, after which sufficient water was added to bring the total solids content in each case to 14%. The latex in all cases aggregated to a thick cream on stirring from 3 to 6 minutes, and after dilution the rubber aggregates rose very rapidly. The cream and serum portions were separated by decantation after 16 hours. The necessary amount of water containing .1% ammonia was then added to the various creams to dilute them to 6% solids content, and the serums again separated from the creams, this time after 4 hours standing. The creams were again diluted with .1% ammonia, this time to a concentration of 6% solids content and final creams recovered by separation of the serums after 68 hours standing.

The times of standing before separation of the creams, namely, 16, 4 and 68 hours, respectively, were chosen purely as a matter of convenience. It would have been easily possible to remove these creams after one or two hours or even less. The concentration of solids in the various creams and serum portions, and the pH's of the latex (determined for convenience on the diluted serums), are shown in the table below. On standing for extended periods of time, or on heating or by treatment with a light shearing action, the rubber aggregates in any of the separated creams could be redispersed to form purified latices of the viscosity of normal ammonia preserved latex.

|  | I | II | III | IV | V | VI | VII |
|---|---|---|---|---|---|---|---|
| pH on 1st addition (determined on diluted serum) | 7.12 | 8.25 | 9.21 | 9.56 | 9.94 | 10.10 | 10.37 |
| Total solids per cent in 1st cream after 16 hrs | 23.3 | 25.6 | 26.1 | 25.0 | 26.3 | 25.6 | 25.5 |
| Total solids per cent in 1st serum after 16 hrs | 3.05 | 2.26 | 1.92 | 1.87 | 1.85 | 1.68 | 2.02 |
| pH on 2nd ammonia addition (determined on diluted serum) | 10.10 | 10.19 | 10.21 | 10.25 | 10.31 | 10.35 | 10.46 |
| Total solids per cent in 2nd cream after 4 hrs | 19.4 | 22.4 | 24.1 | 23.7 | 23.3 | 21.5 | 19.8 |
| Total solids per cent in 2nd serum after 4 hrs | .81 | .69 | .60 | .56 | .62 | .61 | .75 |
| pH on 3rd addition (determined on diluted serum) | 10.45 | 10.49 | 10.50 | 10.51 | 10.53 | 10.52 | 10.56 |
| Total solids per cent in 3rd cream after 68 hrs | 26.8 | 32.8 | 33.3 | 31.1 | 33.7 | 34.5 | 29.4 |

Analyses of dried films of the third cream in samples I and VII above showed purified rubbers analyzing, nitrogen .25%, ash .17%, acetone extract 2.39% and nitrogen .25%, ash .38%, acetone extract 2.49%, respectively, based on the dry rubber.

The following examples illustrate the purification of formaldehyde preserved latex according to the present invention on raising the pH of the latex to within the range 6.5 to 10 by means of alkaline materials other than ammonia, and diluting. In all the following examples, the work was performed in the United States on a 42.5% total solids latex that had been preserved at the plantation by the addition of .5% formaldehyde, the latices thus having been aged over six months.

*Example IV*

Ammonium oleate was stirred into the latex preserved with 0.5% formaldehyde, thereby producing a pasty mass of aggregates which rose rapidly on dilution leaving an almost clear yellow serum having a pH=6.71. After further washing the cream as in the previous examples, part of the aggregates were dried down to a purified rubber which was clear, light yellow in color, and analyzed nitrogen .29%, ash .14% and acetone extract 3.58%, based on the rubber. The remainder readily redispersed to a fluid latex on addition of ammonia and the application of a slight shearing force as by stirring.

*Example V*

In this case 1% zinc oxide based on the rubber was stirred into the latex preserved with 0.5% formaldehyde and allowed to stand. The zinc oxide was introduced as a conventional 50% aqueous paste such as is common in the art of latex compounding, the pH increasing to 7.1. After standing 12 days the mixture was stirred whereby thickening to a paste resulted and upon dilution creaming ensued leaving a yellowish gray subnatant serum.

Example VI

Powdered dry magnesium carbonate was added to the 42.5% latex preserved with 0.5% formaldehyde. This produced a thick crumbly mass which when diluted with water gave aggregates that creamed rapidly leaving an almost clear yellow serum having a pH of 7.5.

Example VII

In this case 2-normal potassium hydroxide was stirred into the 42.5% latex preserved with 0.5% formaldehyde whereupon the mass became thick and aggregated. Upon dilution the aggregates rose rapidly leaving a gray serum that had a pH=9.19. This is in marked contrast to the effect of KOH on a similar latex at pH=13.5 in which case the diluted latex became thinner on standing showing redispersion and there was no rapid rising of aggregated particles.

Example VIII

The latex containing 42.5% solids and preserved with 0.5% formaldehyde was thickened in this case by stirring in various amounts of dimethylamine and trimethylamine to pH's between 6.5 and 9.0. The aggregates produced by the amine thickening of such latices creamed readily on dilution and were easily washed repeatedly to give a purified rubber. Thickening occurred at pH's above 9.0 but the tendency to redisperse on standing increased with higher pH's.

Example IX

Another convenient method of aggregating formaldehyde latex by raising the pH is to mix it with ammonia-preserved latex. To 100 parts by weight of the 42.5% solids latex preserved with 0.5% formaldehyde was added 100 parts by weight of a normal latex which had been preserved with 0.2% formaldehyde followed by .75% ammonia. Before combining these latices the ammonia content of the latter was blown off until a pH=8.05 was attained. This latex then had a solids content of 47.6%. The two latices were mixed and stirred briefly by hand until aggregated. Upon dilution the aggregates rose rapidly leaving a yellowish gray serum of pH=7.00. Further washings were carried out and the washed slurry then recovered by filtration and drying. A yield of 83% was obtained and the purified rubber on analysis showed nitrogen .21%, ash .11%, acetone extract 2.52%. The above process was also carried out using the alkali furnished by a latex preserved with .75% ammonia alone. In this case analysis of the purified rubber obtained showed nitrogen .16%, ash .08%, acetone extract 2.38%, and the yield was 82%.

In view of the many changes and modifications that may be made without departing from the principles underlying the invention, reference should be made to the appended claims for an understanding of the scope of the invention.

Having thus described our invention, what we claim and desire to protect by Letters Patent is:

1. The process of purifying latex which comprises adding to a latex preserved with .2 to 3 percent formaldehyde, which formaldehyde-preserved latex has been aged at least 3 days, sufficient alkaline material to raise the pH to between 6.5 and 11, and diluting to less than 20% solids concentration, allowing the thus treated latex to cream, and separating the cream and serum portions.

2. The process of purifying latex which comprises adding to a latex preserved with .2 to 3 percent formaldehyde, which formaldehyde-preserved latex has been aged at least 3 days, sufficient alkaline material to raise the pH to between 6.5 and 11 and diluting to less than 20% solids concentration, allowing the thus treated latex to cream, separating the cream and serum portions, and washing the cream portion by further dilution and allowing to cream.

3. The process of purifying latex which comprises adding to a latex preserved with .2 to 3 percent formaldehyde, which formaldehyde-preserved latex has been aged at least 3 days, sufficient alkaline material to raise the pH to between 6.5 and 11 and diluting to less than 20% solids concentration, allowing the thus treated latex to cream, separating the cream and serum portions, and materially reducing the viscosity of the final cream with the aid of heat.

4. The process of purifying latex which comprises adding to a latex preserved with .2 to 3 percent formaldehyde, which formaldehyde-preserved latex has been aged at least 3 days, sufficient alkaline material to raise the pH to between 6.5 and 11, agitating until a material thickening takes place, diluting to less than 20% solids concentration, allowing the thus treated latex to cream, separating the cream and serum portions, and raising the pH of the final cream to between 10 and 11.

5. The process of purifying latex which comprises adding to a latex preserved with .2 to 3 percent formaldehyde, which formaldehyde-preserved latex has been aged at least 3 days, sufficient alkaline material to raise the pH to between 6.5 and 11, agitating until a material thickening takes place, diluting to less than 20% solids concentration, allowing the thus treated latex to cream, separating the cream and serum portions, raising the pH of the final cream to between 10 and 11, and materially reducing the viscosity thereof with the aid of heat.

6. The process of purifying latex which comprises adding to a latex preserved with .2 to 3 percent formaldehyde, which formaldehyde-preserved latex has been aged at least 3 days, sufficient ammonia to raise the pH to between 6.5 and 10 and diluting to less than 20% solids concentration, allowing the thus treated latex to cream, and separating the cream and serum portions.

7. The process of purifying latex which comprises raising the pH of a latex preserved with .2 to 3 percent formaldehyde, which formaldehyde-preserved latex has been aged at least 3 days, to a value between 6.5 and 10 by the addition of ammonia and diluting to less than 20% solids concentration, allowing the thus treated latex to cream, separating the cream and serum portions, and raising the pH of the cream to between 10 and 11 by the addition of further ammonia thereto.

8. The process of purifying latex which comprises raising the pH of a latex preserved with .2 to 3 percent formaldehyde, which formaldehyde-preserved latex has been aged at least 3 days, to a value between 6.5 and 10 by the addition of ammonia, agitating until a material thickening takes place, diluting to less than 20% solids concentration, allowing the latex to cream, separating the cream and serum portions, and adding more ammonia to said cream portion.

CHESTER E. LINSCOTT.
JOHN McGAVACK.